United States Patent [19]

Taylor

[11] Patent Number: 5,209,291

[45] Date of Patent: * May 11, 1993

[54] COOLING APPARATUS FOR OPTICAL DEVICES

[75] Inventor: William D. Taylor, Sandy Hook, Conn.

[73] Assignee: Hughes Aircraft Company, Los Angeles, Calif.

[ * ] Notice: The portion of the term of this patent subsequent to Dec. 8, 2009 has been disclaimed.

[21] Appl. No.: 722,649

[22] Filed: Jun. 28, 1991

[51] Int. Cl.⁵ ............................ F28F 3/12; G02B 5/08
[52] U.S. Cl. .................................... 165/168; 165/170; 359/845
[58] Field of Search ...................... 165/168, 170, 80.1, 165/80.5, 185; 359/845

[56] References Cited

U.S. PATENT DOCUMENTS

| | | | |
|---|---|---|---|
| 3,645,608 | 2/1972 | Staley et al. | 359/845 |
| 3,781,094 | 12/1973 | Griest | 165/168 |
| 3,884,558 | 5/1975 | Dunn, III et al. | 359/845 |
| 3,923,383 | 12/1975 | Engel et al. | 165/170 |
| 3,986,768 | 10/1976 | Peters et al. | 359/845 |
| 4,003,641 | 1/1977 | Heinz et al. | 359/845 |
| 4,006,972 | 2/1977 | Nachtman | 359/845 |
| 4,110,013 | 8/1978 | Eitel | 359/845 |
| 4,253,739 | 3/1981 | Carlson | 359/845 |
| 4,895,436 | 1/1990 | Shen | 359/845 |
| 5,073,831 | 12/1991 | Flint | 359/845 |

Primary Examiner—John Rivell
Assistant Examiner—L. R. Leo
Attorney, Agent, or Firm—Wanda K. Denson-Low; Michael W. Sales

[57] ABSTRACT

An internally-cooled optical device 10 includes a manifold 14 having two oppositely disposed coolant input ports 18 and two oppositely disposed coolant output ports 20. The input and output ports are positioned perpendicular to each other. The input coolant flow is divided into macro-channels 28, with each macro-channel having an associated plurality of micro-channels 34 for carrying the coolant along a surface juxtaposed with a surface of the optical device faceplate. The micro-channels terminate in an exit plenum 36 of the macro channel. The exit plenum tapers down to an orifice 38 connected to a return header 42 for delivering the coolant to the outlet ports. The orifices of the macro-channels are sized according to the length of the micro-channels used in the macro-channel, so that each macro-channel has essentially the same pressure drop, and uniform coolant flow is provided in each macro-channel.

20 Claims, 4 Drawing Sheets

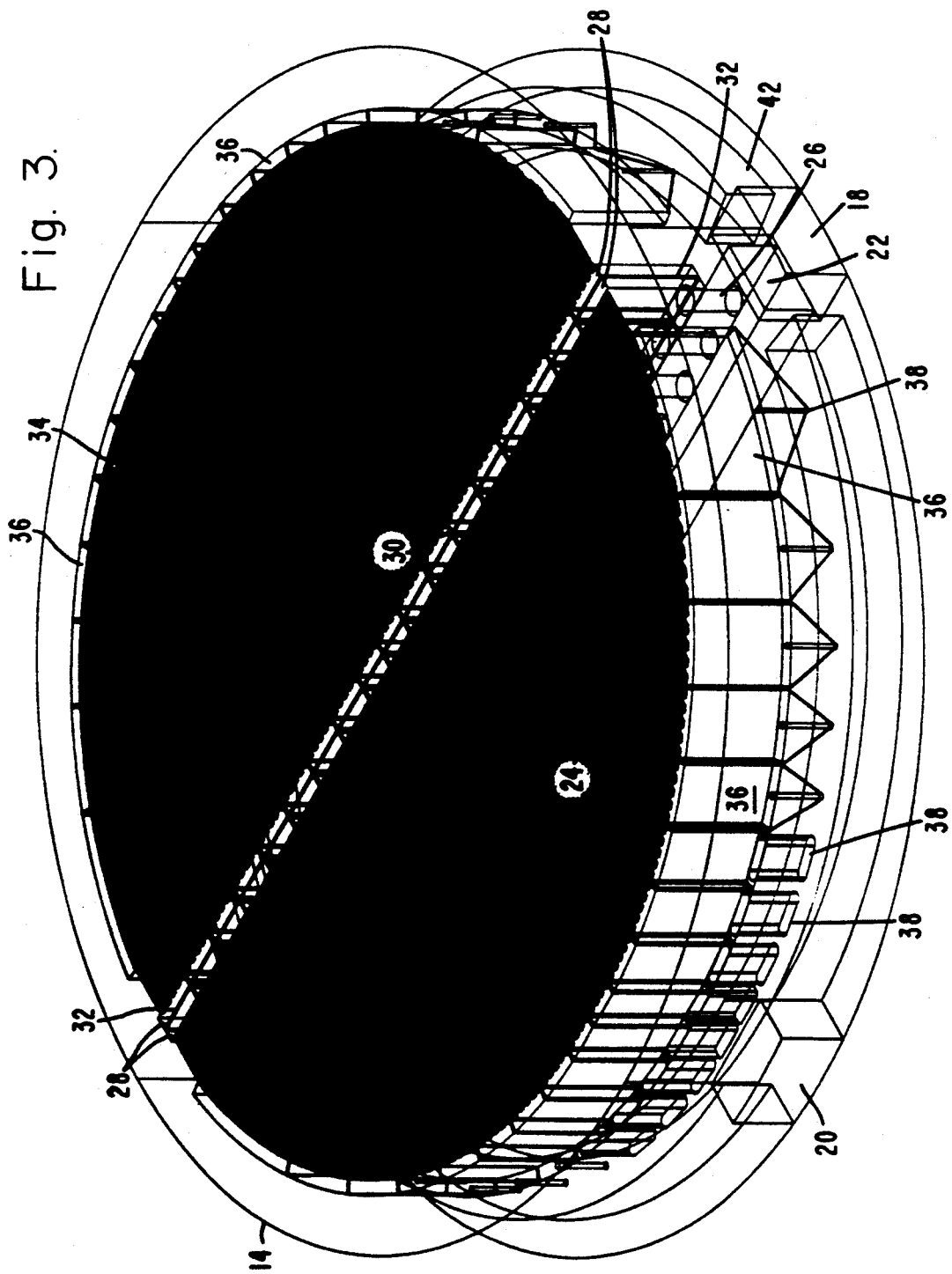

COOLING APPARATUS FOR OPTICAL DEVICES

This invention was made with Government support under Contract Number SDIO 84-89-C0003 awarded by the Strategic Defense Initiative Organization. The Government has certain rights in this invention.

BACKGROUND OF THE INVENTION

1. Field of the Invention

The present invention relates to apparatus for cooling optical devices and, more particularly, to an apparatus for controlling coolant flow within an internally cooled optical device.

2. Description of the Prior Art

Optical devices designed for use with high-energy radiation, such as laser optics and monochromators for X-rays, often require cooling to alleviate the adverse effects of severe thermal buildup that occurs from the absorption of high energy radiation. Excessive thermal buildup can result in thermal distortion of the optical device, which may be caused by material expansion per se, or bending resulting from uneven expansion of the materials of the optical device due to temperature gradients.

In order to alleviate these difficulties, various systems have been developed for cooling such optical devices. An accepted way for cooling these devices is through the use of internal cooling, wherein the optical device is mounted on a cooling manifold for distributing a coolant in proximity to the optical device for providing the required cooling. In order to enhance the cooling efficiency, a typically turbulent coolant flow was desired.

An optical device generally comprises an optical faceplate having an exposed surface for receiving the required radiation. In most instances, the cooled surface of the faceplate material lies within 0.1 mm to 1.0 mm of the exposed faceplate surface; therefore, any extra thickness of the faceplate over the 0.1 to 1.0 mm range is considered to be excess and may be needed only for structural purposes. In order to provide the most efficient cooling possible, the active material should be in close proximity to the coolant; therefore, it is desirable that the faceplate be made as thin as possible.

While it is desirable to have a thin faceplate, this desirable characteristic results in additional problems, in that the thin faceplate is structurally weak and therefore may be adversely affected by the pressure and flow characteristics of the coolant. High coolant pressures can result in high spatial frequency bowing or bending of the faceplate (hydraulic ripple). A turbulent flow of the coolant can generate vibrations in the faceplate. Any displacement or movement of the faceplate surface will distort the resulting image or data.

It has become customary in the art to provide very small cooling channels, which are generally referred to as micro-channels, along the surface of a coolant manifold, with said surface being covered by the faceplate, so that the faceplate essentially forms one wall of the cooling channels. This structure provides the beneficial result that the coolant is in direct contact with the faceplate material, but again subjects the faceplate to coolant pressure and vibration due to turbulent coolant flow.

Most prior art devices have either paid little attention to controlling the flow to each cooling channel, or have micro-managed the flow such that each cooling channel has its own inlet and outlet and flow control means. The former approach results in a simple design but rather uneven cooling that can result in unacceptable thermal distortions in the optical device. The latter approach is extremely complicated, requiring flow control for each micro-channel, resulting in excessively high cost.

SUMMARY OF THE INVENTION

The present invention provides a compromise between the prior art systems, where cooling flow was either uncontrolled or was micro-managed, by uniquely providing a manifold configuration for an internally-cooled optical device that provides for efficient cooling, temperature control and a uniform coolant flow. The manifold is designed so that a number of individual micro-channels are grouped into a macro-channel. These macro-channels are physically separated from each other, each having its own inlet and outlet to supply and return headers. The macro-channel outlet comprises an exit plenum chamber tapering to an orifice, the size of which is controlled so that similar pressure drops are experienced from the supply header to the return header by all macro-channels. A rib structure is used to physically separate the macro-channels from each other above the supply header. The ribs extend to the manifold surface on which the faceplate is mounted, so that the ribs provide additional structural support for the cooled faceplate in the area of the macro-channels.

The supply and return headers are divided on opposite sides of the device so as to have two oppositely disposed supply inputs and two oppositely disposed return outlets. The inputs and outlets are displaced 90 degrees from each other. This positioning tends to neutralize supply and return forces exerted on the optical device. The exit plenums for the macro-channels are located outwardly from an active aperture area of the optical device, so as to minimize the effects of flow turbulence in the exit plenum on the optical image.

Through the unique use of the present invention, each macro-channel may be controlled to remove the same amount of coolant fluid from the supply header, thereby making the flow control less complex and the flow-induced disturbances smaller. If desired, the design can be tailored to some degree to provide less coolant flow to areas where the heat input is smaller, thereby matching the heating and cooling rates to provide uniform distortion of the faceplate in the area of the clear aperture.

A primary objective of the present invention is to provide a means for economically controlling the cooling provided by an internal heat exchanger of an optical device.

Another objective of the present invention is to provide uniform coolant flow through an internally-cooled optical device.

Another objective of the present invention is to provide for control of the coolant flow at a location outside of the aperture of an optical device.

DESCRIPTION OF THE DRAWINGS

FIG. 3 is an isometric view of the manifold of FIG. 2 shown constructed of clear material so that the internal structure may be more easily illustrated.

DETAILED DESCRIPTION OF THE PREFERRED EMBODIMENT

Figure 1:
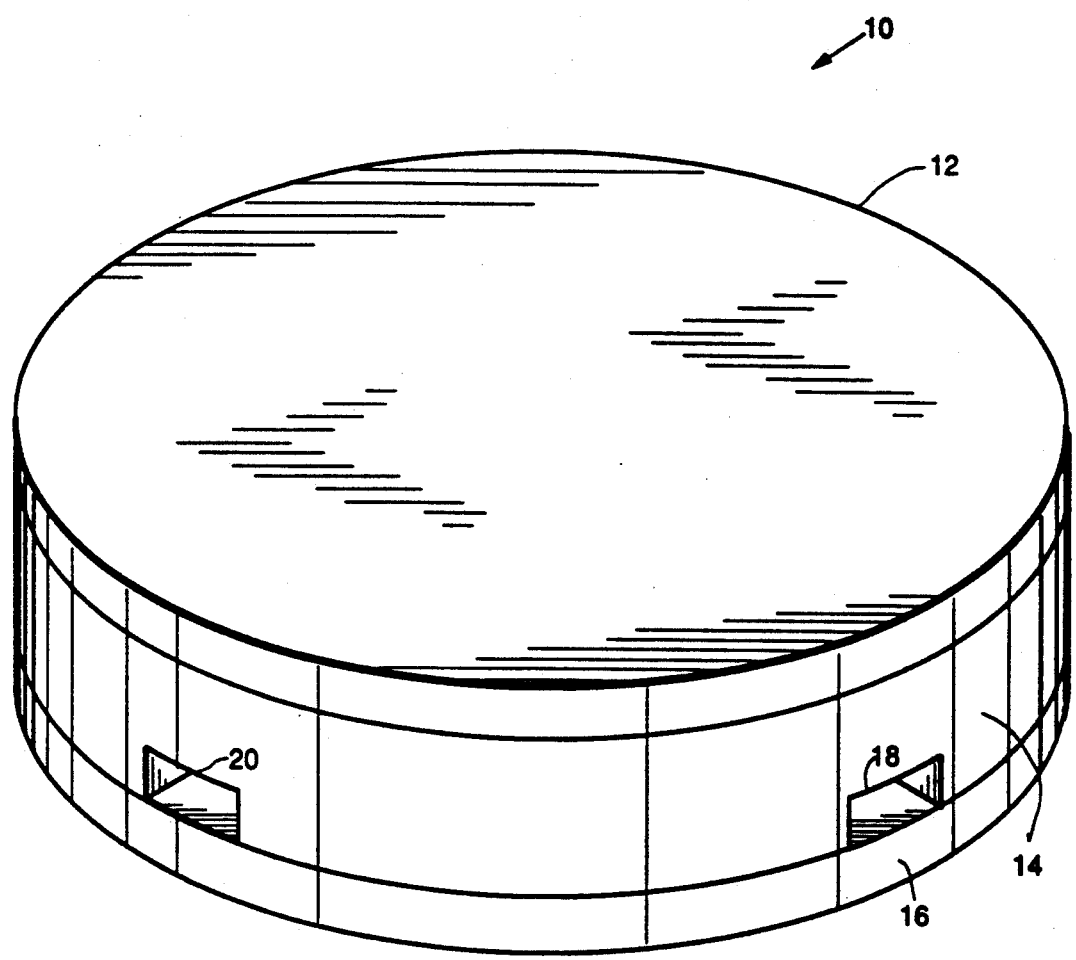
FIG. 1 is an isometric view of a cylindrically-shaped, internally-cooled optical device.

Referring to FIG. 1, there is shown a cylindrically-shaped, internally-cooled optical device 10 comprising an optical faceplate 12, a coolant manifold 14 and a substrate 16. The material of the faceplate 12 is determined primarily by the particular function performed by the optical device. Examples of materials include single crystal silicon, ZERODUR, silicon carbide, or the like. The thickness of the faceplate is typically between 0.1 mm to 1.0 mm but may vary, again depending upon the function. The coolant manifold 14 may be made of several different types of materials, but should have thermal expansion characteristics closely matching those of the faceplate 12, and preferably being some form of an insulator, such as glass.

Desirable characteristics for the material include: same CTE as faceplate, bondable to faceplate, low thermal conductivity to trap heat in hex, adequate strength for structural loads, and machinable. Examples of materials that may be used include: ZERODUR, glass, silicon carbide, and silicon.

An embodiment of the present invention was constructed of a glass ceramic material provided by Schott Glass under the trade name ZERODUR. ZERODUR is an extremely hard, rigid material with the following characteristics: low CTE, low thermal conductivity, bondable, and machinable.

The substrate 16 should also be formed of the same material as the coolant manifold 14 or could possibly be another compatible material. The faceplate 12, coolant manifold 14 and substrate 16 are attached together using various bonding methods compatible with materials being used.

The optical device 10 may have a diameter of several centimeters, up to about 36 cm.; however, it is to be understood that the principles of the present invention are not limited to a device of this size, but could be equally applied to devices of smaller or larger sizes and also of different shapes.

The manifold 14 is provided with two coolant inlets 18 disposed on opposite sides of the manifold, and two outlets 20, also disposed on opposite sides of the manifold, but positioned orthogonally to the inlets 18. By utilizing pairs of inlets and outlets disposed on opposite sides of the optical device, any systemwide forces exerted on the optical device by the inlet/outlet coolant flow are effectively neutralized.

Figure 2:
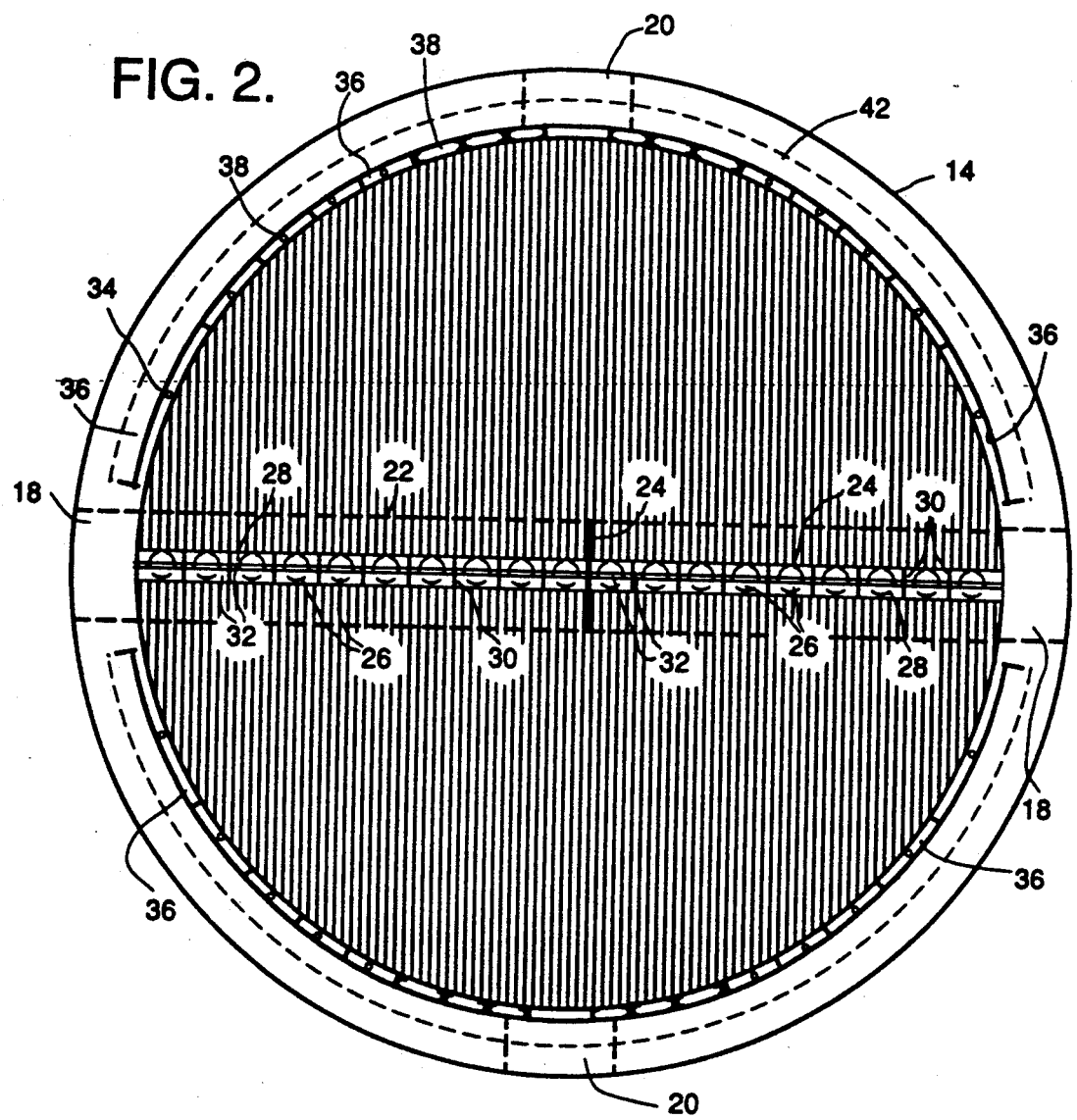
FIG. 2 is a planar view of a manifold used with the optical device of FIG. 1.
Figure 4:
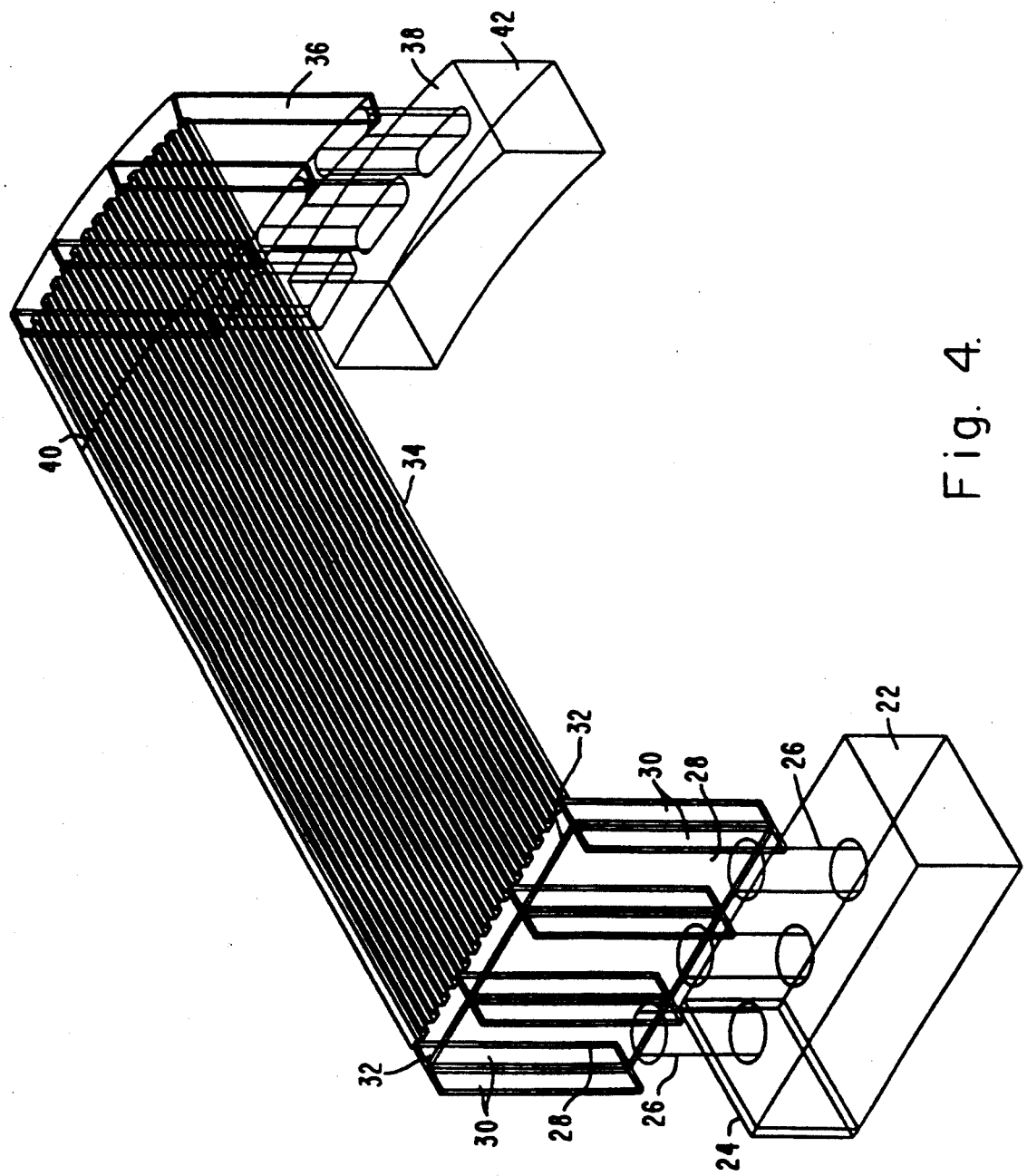
FIG. 4 is an enlarged partial isometric view showing a portion of the manifold of FIG. 3.

Referring to FIGS. 2, 3 and 4, the details of the manifold 14 are most clearly shown. Input ports 18 are provided to receive pressurized coolant at opposite sides of the manifold 14. Supply headers 22 extend inwardly from the input ports 18 but are divided by a wall 24, which prevents the mixing of the two coolant flow streams, thereby minimizing disturbances in the coolant flow. A plurality of branch tubes 26 extend upwardly from the supply headers 22 to provide coolant flow to macro-channels 28. Macro-channel ribs 30 are provided to separate adjacent macro channels from each other. Dividing ribs 32 extend from one macro-channel rib 30 to another and function to bisect the branch tubes 26 to divide the coolant flow received therefrom. The ribs 30 and 32 extend upwardly to the top surface of the manifold, as is shown most clearly in FIGS. 3 and 4, and serve a secondary function of supporting the thin faceplate in the areas of the macro-channel openings, to prevent faceplate distortion and vibration in such areas.

A plurality of micro-channels 34 are formed in an upper planar surface of the manifold 14 and extend in opposite directions perpendicular to the supply header so as to carry coolant flow in an outwardly direction from the macro-channels 28. Each macro-channel 28 is connected to a group of micro-channels, such as five micro-channels. The exact size of the micro-channels will depend upon the application to which the present invention is applied; but in one structural embodiment, the micro-channels are 80 um wide and 1,000 um deep, with an 80 um separation between each channel. In another application, the micro-channels are 635 um wide ×381 um deep, with 635 um separation. The channels are closed by the faceplate, which is affixed, i.e., bonded, to the top surface of the manifold 14, thereby defining flow passages wherein the coolant is in direct contact with the material of the faceplate.

Figure 5:
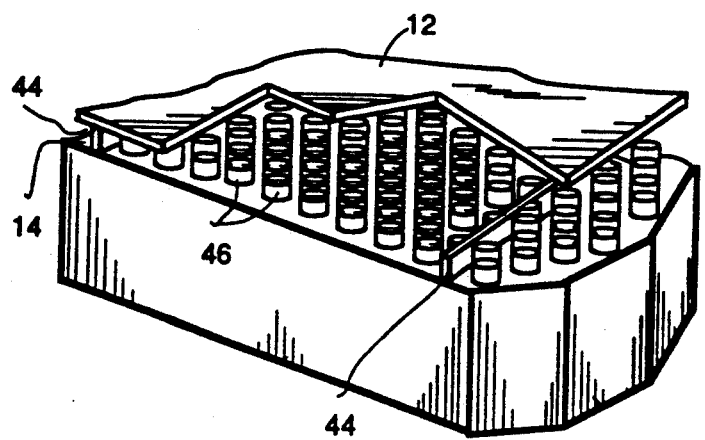
FIG. 5 is a cutaway isometric view of a portion of another embodiment of the manifold.

The micro-channels could be replaced by a pin fin arrangement as shown in FIG. 5. The manifold 14, instead of having micro-channels 34 formed therein, has upstanding walls 44 corresponding in spacing to the ribs 30 dividing the macro-channels 28. The walls 14 support the faceplate 12 and are bonded thereto. Between the walls 44 are formed cylindrical pin structures 46 which extend upwardly to the faceplate 12 and are arranged in a matrix. Passages are defined between the pin structures 46 for the flow of coolant from the macro-channel.

The micro-channels associated with each macro-channel extend across the upper surface of the manifold 14 and terminate at a plenum chamber 36 associated with each macro-channel. Each plenum chamber 36 has a lower portion that tapers downwardly to an orifice 38, which is sized to control the flow of coolant through its associated macro-channel. The smaller orifices 38 have a circular cross-section, while the larger orifices are elliptical, as is most clearly shown in FIG. 2. The tapered portion of the plenum chamber is most clearly seen in FIGS. 3 and 4, where the taper portions have an elliptical cross-section. The purpose of the orifices 38 is to equalize the pressure drop across each macro-channel. Essentially, the size of each orifice is determined by the length of the micro-channels that make up each macro-channel. Ideally the coolant pressure drop across the micro-channels and the associated orifice should be constant for all macro-channels. Thus, the shorter micro-channels found near the input ports 18 are associated with much smaller orifices, to make up for the smaller pressure drop across the short micro-channel, as compared to the larger pressure drop that would be experienced with the longer micro-channels, such as those near the outlet ports 20.

In general, optical devices have a clear aperture 40 which defines the active surface area of the device, or faceplate. It is to be noted that in the present invention, the orifices are positioned outside and below the aperture 40 so as to limit flow-induced distortions to the faceplate. At the plenums and orifices, the coolant flow will inherently be somewhat turbulent, thereby causing possible vibration and slight movements of the thin faceplate. By locating these components outside of the aperture, the effect of such vibrations is minimized.

The orifices terminate in return headers 42, which are connected to the outlet ports 20.

In a sample device constructed in accordance with the present invention, coolant was provided at a pressure slightly greater than $49.64 \times 10^3$ Pa (7.2 psi), and it was determined that the pressure drop across the microchannels varied from $23.44 \times 10^3$ Pa (3.4 psi) to $46.19 \times 10^3$ Pa (6.7 psi), and the pressure across the associated orifices varied from $22.41 \times 10^3$ Pa (3.25 psi) to 6.8 Pa (0.001 psi), thereby providing a pressure drop difference between macro-channels of approximately 340 Pa (0.05 psi). Thus, the coolant flow through the channels was very uniform to provide even cooling over the entire area of the optical device. Flow disturbances were minimized, thereby reducing the adverse effect on the optical device and reducing distortion. By having equal cooling flow through the macro channels, flow-induced disturbances can be minimized, as well as coolant pressure-generated disturbances.

The present invention has been described in conjunction with a flat faceplate and a manifold having a flat surface. However, the principles of the present invention are equally applicable to other shaped surfaces, such as concave or convex surfaces.

In the event that uneven heating of an optical faceplate is experienced, the cooling provided by the coolant may be tailored to a degree by varying the orifice sizes, to thereby match the cooling to the heat absorption experienced by the faceplate. By uniquely using pairs of inlet and outlet ports, forces generated by the coolant flow are equalized, thereby minimizing any distortion resulting from such forces.

In view of the above, it is apparent that the present invention provides an improved cooling apparatus for optical devices by providing more efficient cooling and minimizing flow disturbances.

What is claimed is:

1. A cooling apparatus for a device of the type that has a surface, said cooling apparatus comprising:
   a body having a surface sized and configured to be in juxtaposition with and sealed to the surface of said device;
   a plurality of grooves formed in the surface of said body, said grooves being closed by said device to form channels having first and second ends;
   means for providing coolant flow to the first end of each of said channels;
   a plurality of plenums disposed at the second ends of said channels, each plenum being connected to receive coolant from one of said channels; and
   an orifice, formed in each said plenum, for the flow of coolant out of the plenum, each said orifice being sized to control the flow of coolant through the channel associated with the plenum, whereby the rate of cooling provided by different channels may be controlled.

2. A cooling apparatus as described in claim 1, wherein each of said grooves comprises a group of subgrooves, said subgrooves forming a group of microchannels.

3. A cooling apparatus as described in claim 2, wherein the coolant is provided under pressure and experiences a pressure drop as it passes through said channels, said pressure drop varying between said channels, said orifices being sized to provide a pressure drop so that the sum of the pressure drop through a channel and the pressure drop across the associated orifice is approximately equal for all channels.

4. A cooling apparatus as described in claim 2, wherein the plenums terminate in a tapered passage having a wide first end which receives said coolant, and a second end which forms said orifice.

5. A cooling apparatus as described in claim 4, wherein the tapered passages have an elliptical cross section and a smooth, continuous surface to prevent turbulent coolant flow.

6. A cooling passage as described in claim 2, additionally comprising a return header connected to said orifices for receiving coolant flow from the orifices.

7. A cooling apparatus as described in claim 1, wherein the means for providing coolant flow to the first end of each of said channels comprises:
   a supply header receiving said coolant;
   a plurality of branch tubes extending from said supply header; and
   a like plurality of macro-channels, each associated with a branch tube for receiving coolant from the branch tube, said macro-channels each supplying one of said channels.

8. A cooling apparatus as described in claim 7, additionally comprising a return header connected to said orifices for receiving coolant flow, said return header having an outlet port, and said supply header having an inlet port, said outlet port and said inlet port being positioned orthogonally to each other.

9. A cooling apparatus as described in claim 7, wherein said supply header extends across said body and has an inlet port at each end and a partition midway to separate coolant flow received at each end.

10. A cooling apparatus as described in claim 1, wherein said means for providing coolant flow to the first end of each of said channels extends across said body and bisects the body, said plurality of grooves extending in first and second opposite directions from said means for providing coolant flow.

11. A cooling apparatus as described in claim 10, additionally comprising first and second return headers each connected to receive coolant flow from orifices associated with grooves extending in said first and second directions, respectively.

12. A cooling apparatus as described in claim 11, wherein the means for providing coolant flow to the first end of each of said channels includes a supply header extending across said body and having first and second inlet ports disposed on opposite ends of said supply header, whereby inlet coolant flow forces exerted on the apparatus are balanced.

13. A cooling apparatus as described in claim 12, wherein said first and second ports of said supply header and said first and second ports of said return header are disposed orthogonally to each other, whereby the inlet and outlet flow forces are balanced.

14. A cooling apparatus as described in claim 10, wherein the means for providing coolant flow to the first end of each of said channels comprises:
   a supply header receiving said coolant;
   a plurality of branch tubes connected to said supply header; and
   a like plurality of macro-channels each associated with a branch tube for receiving coolant from said branch tube, said macro-channels each supplying two of said channels, said macro-channels being separated by partitions, and having additional partitions segmenting said macro-channels into two portions, said additional partitions bisecting said branch tubes to divide the coolant flow to the channels extending in said first and second directions, said partitions extending to the surface of said body to provide support for the device.

15. A cooling apparatus as described in claim 1, wherein said device is an optical device, comprising a flat plate having a defined optical aperture area, the second ends of said channels and plenums being disposed at a location beyond said aperture, so that flow turbulence in the plenums will not adversely affect the optical device by vibrating the aperture area.

16. A cooling apparatus as described in claim 15, wherein the optical device is substantially circular, having a circular aperture, wherein the second ends of said channels substantially define a circle having a radius greater than the radius of the optical aperture, said channels having varying lengths and consequently varying pressure drops, the differences in said pressure drops being compensated for by the pressure drop across the orifice associated with each of said channels.

17. A cooling apparatus as described in claim 1, wherein each of said grooves has formed therein a plurality of upstanding members arranged in a matrix to define coolant flow passages therebetween.

18. A cooling apparatus as described in claim 17, wherein the members are cylindrical and extend upwardly to the surface of the device and are bonded thereto.

19. A cooling apparatus as described in claim 17, wherein the coolant is provided under pressure and experiences a pressure drop as it passes through said channels, said pressure drop varying between said channels, said orifices being sized to provide a pressure drop so that the sum of the pressure drop through a channel and the pressure drop across the associated orifice is approximately equal for all channels.

20. A cooling apparatus as described in claim 19, wherein the plenums terminate in a tapered passage having a wide first end which receives said coolant, and a second end which forms said orifice.

* * * * *